(12) United States Patent
Sharpe (10) Patent No.: US 6,981,366 B2
(45) Date of Patent: Jan. 3, 2006

(54) TURBINELESS JET ENGINE (76) Inventor: Thomas H. Sharpe, 55 Dorr Dr., North Augusta, SC (US) 29841

( * ) Notice: Subject to any disclaimer, the term of this patent is extended or adjusted under 35 U.S.C. 154(b) by 401 days.

(21) Appl. No.: 10/739,082

(22) Filed: Dec. 19, 2003

(65) Prior Publication Data
US 2004/0216447 A1 Nov. 4, 2004

Related U.S. Application Data (60) Provisional application No. 60/466,790, filed on May 1, 2003.

(51) Int. Cl.
F02K 7/00 (2006.01)
F02K 7/10 (2006.01)
F02K 7/12 (2006.01)

(52) U.S. Cl. ........................................ 60/269; 60/39.52
(58) Field of Classification Search .................. 60/262, 60/269, 39.52
See application file for complete search history.

(56) References Cited

U.S. PATENT DOCUMENTS

| 2,502,332 | A | * | 3/1950 | McCollum | 60/267 |
| 2,920,445 | A | * | 1/1960 | Bailey | 60/262 |
| 2,920,448 | A | * | 1/1960 | Coanda | 60/269 |
| 3,188,804 | A | | 6/1965 | Melenric | |
| 3,323,304 | A | | 6/1967 | Llobet et al. | |
| 3,517,510 | A | | 6/1970 | Melenric | |
| 3,570,250 | A | * | 3/1971 | Pensel | 60/269 |
| 3,676,999 | A | * | 7/1972 | Oldfield | 60/606 |
| 3,750,400 | A | | 8/1973 | Sharpe | |
| 3,800,529 | A | | 4/1974 | Sharpe | |
| 3,800,531 | A | | 4/1974 | Sharpe | |
| 3,841,090 | A | | 10/1974 | Sharpe | |
| 4,085,585 | A | | 4/1978 | Sharpe | |
| 4,118,929 | A | | 10/1978 | Sharpe | |
| 4,267,694 | A | | 5/1981 | Sharpe | |
| 4,962,641 | A | | 10/1990 | Ghougasian | |
| H001008 | H | * | 1/1992 | Schadow et al. | 60/737 |
| 5,189,875 | A | | 3/1993 | Melenric | |

* cited by examiner

Primary Examiner—Ted Kim
(74) Attorney, Agent, or Firm—Richard C. Litman (57) ABSTRACT A turbineless jet engine includes no internal moving components, yet operates using a continuous combustion principle. The present engine is self-starting, i.e., no auxiliary source of pressurized airflow or unconventional fuels is required for its starting and operation. The present engine also requires no electrical energy after the combustion process has been initiated, with its fuel pump being operated by exhaust air from the engine. Starting injectors entrain airflow through the engine, with a portion of the inlet air being drawn through radially disposed, hollow pressure generators to the combustion section of the engine. Exhaust gas is recirculated to the front of the engine and passed through the pressure generators to entrain fresh air, to continue the cycle of operation. The present engine may be constructed in a variety of non-circular cross-sectional shapes, with or without inlet vane sweep, as desired, due to its lack of internal rotating components.

18 Claims, 7 Drawing Sheets

TURBINELESS JET ENGINE

CROSS-REFERENCE TO RELATED APPLICATION

This application claims the benefit of U.S. Provisional patent application Ser. No. 60/466,790, filed May 1, 2003.

BACKGROUND OF THE INVENTION

1. Field of the Invention

The present invention relates generally to reaction type internal combustion engines, and more specifically to a jet engine incorporating compressor, combustion, and compressor airflow entrainment means, but which incorporates no turbines or other moving parts, except for the fuel pump.

2. Description of Related Art

Internal combustion reaction type engines embodying various principles of jet engines have been known for a considerable period of time. Such engines of the prior art may be generally categorized as ram jet engines with no internal moving parts, pulse jet engines with oscillating inlet vanes, and turbojet engines with rotating compressor and turbine sections.

The turbojet engine was developed relatively recently in the history of internal combustion engines, being used operationally only toward the end of World War II. This is primarily due to the extremely high temperatures and rotational speeds attained by the exhaust turbine(s) within the engine, with revolutions per minute (rpm) generally reaching a few tens of thousands of rpm. As a result, the metallurgy and manufacturing tolerances required for turbojet engines are quite demanding and costly. Moreover, "hot" section inspections of the combustion and exhaust turbine sections are relatively frequent, due to the extremely high temperatures attained in those areas of the engine and the high centrifugal forces encountered by the exhaust turbine as it rotates at tens of thousands of rpm. However, turbojets have proven to be more efficient than other forms of internal combustion reaction engines, and as a result are nearly universally used where jet propulsion is required.

The desirability of a simpler form of jet engine is evident, after considering the limitations and expense of turbojet engines. A simpler form of jet engine is the pulsejet, which uses a series of oscillating vanes at the inlet end of the engine. Pulse jet engines have also been known for quite some time, with pulsejets being used as model aircraft jet engines and in some unpiloted aircraft. The pulse jet principle eliminates the rapidly rotating compressor and exhaust turbines, but the inlet vanes are prone to damage and the life span of the typical pulse jet is unlikely to exceed several hours at a maximum. Moreover, pulsejets are relatively inefficient and burn considerably more fuel than turbojets for an equivalent amount of thrust, and generally require an external source of pressurized air for starting.

The ramjet, with its lack of moving parts, provides a solution to the problem of rapidly rotating or oscillating components. However, the ramjet has other limitations which do not exist with turbojets and pulsejets. The ramjet relies upon the internal pressure differential produced by the shock wave developed within the engine as air passes from supersonic to subsonic flow. This is achieved by carefully shaped and contoured venturis within the engine, which accelerate and decelerate the airflow as desired. The result is an engine which is capable of producing practicable amounts of thrust with no moving parts. However, ramjet engines cannot operate at zero ambient airflow velocity. They require some airflow velocity before the air flowing through the engine can reach the velocities required for the engine to function. As a result, ramjet engines require some other engine principle (usually a rocket, with unmanned aircraft) to provide the initial acceleration and velocity for operation.

Consideration of the above engine principles and their corresponding limitations leads to the realization that an engine featuring the structural simplicity of the ramjet with its lack of moving parts, along with the relative efficiencies of the turbojet and its ability to operate at zero ambient airspeed, would be a most desirable development. The present turbineless jet engine responds to this need, by providing a reaction engine having a series of inlet vanes which emulate the compressor section of a conventional turbojet engine, with the inlet and compression section of the present turbineless engine feeding the compressed air to a combustion or burner section. Most of the heated exhaust air passes rearwardly through the engine to produce thrust, with a relatively small percentage passing back through the engine to the inlet and compressor section to entrain incoming airflow, thereby continuing the process.

The only moving component required in the present turbineless engine, is an internal fuel pump turbine. The fuel pump turbine itself is operated by relatively high pressure exhaust gas from the combustion section of the engine once the engine is in operation, thereby eliminating the need for electrical and/or other power for the engine, except during the starting procedure.

A discussion of the related art of which the present inventor is aware, and its differences and distinctions from the present invention, is provided below.

U.S. Pat. No. 3,188,804 issued on Jun. 15, 1965 to John A. Melenric, titled "Turbo Supercharged Valveless Pulse Jet Engine," describes an engine combination having a central turbojet engine which provides some compressed airflow to a series of valveless reaction engines disposed in an annular array about the turbojet engine. The valveless engines are described as utilizing an intermittent combustion principle (as opposed to the continuous combustion used in the present engine), but Melenric does not disclose any form of oscillating inlet control vanes for his annular engines. In any event, the use of a rotating turbine to drive a rotating compressor in the central turbojet engine, results in the Melenric engine more closely resembling a conventional turbojet engine than it does the present engine.

U.S. Pat. No. 3,323,304 issued on Jun. 6, 1967 to Andres F. Llobet et al., titled "Apparatus For Producing High Temperature Gaseous Stream," describes a turbineless engine which utilizes a series of concentric venturis to control the flow of gases through the engine. Heat exchanger tubes are also included within the engine. The Llobet et al. engine requires a pressurized source of gaseous fuel (e.g., propane, etc.), at least for starting. Llobet et al. also describe the use of a liquid fuel mixed with water, with the water being broken down into its chemical elements and recombined with other elements to produce heat and thrust. The structure of the Llobet et al. engine is annular, with no radially disposed louvered pressure generator airflow guides, as provided by the present turbineless engine. Moreover, Llobet et al. make no disclosure of any non-circular cross section for their turbineless engine.

U.S. Pat. No. 3,517,510 issued on Jun. 30, 1970 to John A. Melenric, titled "Self-Starting Valveless Resonant Pulse-Jet Engine And Method," describes an engine having a series of annular valveless engines which operate on a pulse principle. Exhaust is fed into a central collector, where most of the exhaust thrust is generated. The engine of the Melenric '510 U.S. patent requires a pressurized gaseous fuel, with power being determined by the mix of gaseous vs. liquid fuel selected from the pressurized tank. The present engine is configured to operate using a more conventional fuel. No radially disposed pressure generator airflow guides are disclosed in the Melenric '510 U.S. patent, as provided in the present turbineless jet engine invention. Moreover, no disclosure is made of an engine having other than a circular or annular configuration, in the Melenric '510 patent.

U.S. Pat. No. 3,750,400 issued to Thomas H. Sharpe on Aug. 7, 1973, titled "Self-Starting Air Flow Inducing Reaction Motor," describes an engine having only a single moving mechanism, i.e., an inlet diffuser cone. The inlet cone translates forwardly and rearwardly depending upon dynamic pressure, and moves the attached fuel injector assembly correspondingly. The fuel injector system entrains airflow into a convergent-divergent inlet duct, with the fuel and air mixing and igniting in the combustion section downstream of the inlet. The engine of the Sharpe '400 U.S. patent also requires a relatively high energy consuming preheating assembly for its operation, which feature is not required of the engine of the present invention. The engine of the Sharpe '400 U.S. patent is more closely related to the ramjet principle of operation. No radially segmented, louvered pressure generator airflow guides are provided in the engine of the Sharpe '400 U.S. patent.

U.S. Pat. No. 3,800,529 issued on Apr. 2, 1974 to Thomas H. Sharpe, titled "Self-Starting Series Jet Engine With Throttling Assemblies," is a continuation-in-part of the '400 U.S. patent to the same inventor, discussed immediately above. FIGS. 6A and 6B are identical in the '400 and '529 U.S. patents, with other structure and operating principles being closely related between the two.

U.S. Pat. No. 3,800,531 issued on Apr. 2, 1974 to Thomas H. Sharpe, titled "Self-Starting Annular Jet Engine With Plural Burner And Bypass Duct," is another continuation-in-part of the '400 U.S. patent to the same inventor, discussed further above. The Sharpe '531 U.S. patent is primarily directed to the embodiment of FIGS. 8A and 8B of the '400 U.S. patent. As in the other patents issued to the same inventor noted above, no radially segmented, louvered pressure generator airflow guides are disclosed in the '531 U.S. patent.

U.S. Pat. No. 3,841,090 issued on Oct. 15, 1974 to Thomas H. Sharpe, titled "Jet Engine Method," is a divisional patent of the '400 U.S. patent, discussed further above. The Sharpe '090 U.S. patent is directed to the method of operation of the various embodiments or engine variations disclosed in the various patents to the same inventor, discussed above. The same points of distinction noted between those patents and the present invention, are seen to apply here as well.

U.S. Pat. No. 4,085,585 issued on Apr. 25, 1978 to Thomas H. Sharpe, titled "Impaction/Induction Jet Engine," describes a turbineless jet engine configuration which superficially resembles the engine of the present invention. However, a considerable number of differences exist between the engine of the earlier '585 U.S. patent and the engine of the present invention by the same inventor. First, and most obviously, the engine of the '585 U.S. patent includes a series of radially disposed exhaust capture vanes, which capture a portion of the exhaust and route it forward to entrain incoming airflow. The present engine does not require these exhaust capture vanes. Second, the engine of the '585 U.S. patent incorporates relatively costly conventional burner cans in the combustion area. The present engine utilizes a concentric annular ring of combustion venturis, with each having an upstream starting fuel injector and a downstream run fuel injector. Third, the engine of the '585 U.S. patent has a relatively small central exhaust gas return duct. The diameter of the exhaust gas return duct of the engine of the present invention is much larger proportionally to the cross sectional area of the engine, preferably on the order of about thirty percent of the engine diameter or width at the combustion section. Fourth, the present engine incorporates "flame holders" or deflectors and fuel deflectors to break up the fuel stream from the start fuel injectors. Finally, the engine of the present invention may incorporate rearwardly (or forwardly) swept louvered inlet pressure generators and different cross-sectional shapes, which features are not disclosed by the present inventor in any of his earlier issued patents, nor in any of the related art known to the present inventor.

U.S. Pat. No. 4,118,929 issued on Oct. 10, 1978 to Thomas H. Sharpe, titled "Impaction Augmented Jet Engine," is another continuation-in-part of the '400 U.S. patent to the same inventor discussed further above, through a chain of abandoned continuation applications. The same points noted further above regarding the engines of the '929 and '400 U.S. patents to the same inventor, are seen to apply here as well.

U.S. Pat. No. 4,267,694 issued on May 19, 1981 to Thomas H. Sharpe, titled "Staged Induction Engine," describes a turbineless jet engine configuration which is essentially "inside-out" from the present engine configuration. The engine disclosed in the '694 U.S. patent has a single, centrally located burner can which exhausts through a series of axially central, concentric ducts. These ducts deliver some percentage of the exhaust flow to a series of peripherally located ducts, which route the exhaust flow forward to a series of intake vanes at the front of the engine. The exhaust flow, along with the centrally located fuel injectors, entrains incoming air to the engine for operation. The intake vanes direct the exhaust flow and entrained intake air radially inwardly to the central burner can. The present engine utilizes a peripherally disposed combustion area, with a single, centrally located exhaust gas recirculation passage.

U.S. Pat. No. 4,962,641 issued on Oct. 16, 1990 to John N. Ghougasian, titled "Pulse Jet Engine," describes a vaneless pulsejet using a resonator chamber to fill and discharge a portion of the exhaust gas by oscillation. The pulsating exhaust gas pressure affects the incoming airflow, producing pressure pulses for a series of closely spaced combustion events. The Ghougasian engine apparently requires some form of compressed air for starting, as in conventional pulsejets, but unlike the present turbineless engine. The present engine is not a pulsejet, but rather is a continuous combustion engine with stable internal pressures and temperatures at any given location within the engine, for a given set of operating parameters.

Finally, U.S. Pat. No. 5,189,875 issued on Mar. 2, 1993 to John A. Melenric, titled "Self Starting Valved Pulse Jet," describes an engine configuration related to the engines of the '804 and '510 U.S. patents to the same inventor, discussed further above. As in those engines, the engine of the Melenric '875 patent uses a pressurized fuel, e.g. propane or the like, and also utilizes a pulse valve system to control combustion after the initial startup phase, unlike the present turbineless engine.

None of the above inventions and patents, taken either singly or in combination, is seen to describe the instant invention as claimed.

SUMMARY OF THE INVENTION

The present invention comprises a turbineless jet engine having no internal moving parts whatsoever. The only moving component required for the operation of the present engine is contained within an externally mounted fuel pump, which may be operated by exhaust air from the engine once the engine has been started. No electrical energy is required to operate the present engine once it has been started and the fuel pump is being powered by exhaust air from the operating engine. However, other accessories (e.g., electrical generator, etc.) may be powered by exhaust air from the present engine, if so desired.

The present turbineless jet engine includes a series of radially disposed, louvered pressure generators at the inlet end thereof, which serve to channel a portion of the incoming airflow to a generally centrally located annular combustion area. Fuel is injected into this area, with the starting injectors oriented to entrain airflow through the engine during startup. As the air-fuel mixture is burned, it is exhausted to produce thrust, with a portion of the exhaust producing a backflow through a large diameter, axial return duct. The forward end of the return duct communicates with the louvered pressure generators to entrain airflow therethrough.

The present engine includes various additional details as well, such as flame deflectors and novel fuel deflectors to break up the fuel stream from the start injectors. The present turbineless engine, with its lack of internal moving parts, is not limited to a circular cross section, as are conventional turbojet engines. The present disclosure also includes a series of engine configurations having different, non-circular cross sections, as well as a circular cross section configuration. Moreover, the louvered pressure generators at the inlet end of the engine may be swept at some angle other than normal to the central axis of the engine, if so desired, due to their lack of rotation and corresponding lack of centrifugal force acting upon these vanes.

Accordingly, it is a principal object of the invention to provide a turbineless jet engine having no internal moving parts.

It is another object of the invention to provide such a turbineless jet engine in which a portion of the exhaust flow is redirected forward through the center of the engine, and ducted to entrain fresh air into the engine and its combustion area.

It is a further object of the invention to provide a jet engine having a fuel pump operated by exhaust flow from the engine, thereby obviating any requirement for electrical power for the engine once it has been started.

Still another object of the invention is to provide a jet engine having a variety of different embodiments of different cross-sectional shapes, which may include sweep of the louvered pressure generator assembly to angles other than normal to the central axis of the engine.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a turbineless jet engine, i.e., a jet thrust or reaction engine having no internal moving parts. The present engine does not utilize an intermittent combustion operating principle, such as pulse jet engines, but uses a continuous combustion cycle more closely related to conventional turbojet engine operation, but without the high speed rotating compressor and turbine sections of such turbojet engines.

Figure 1:
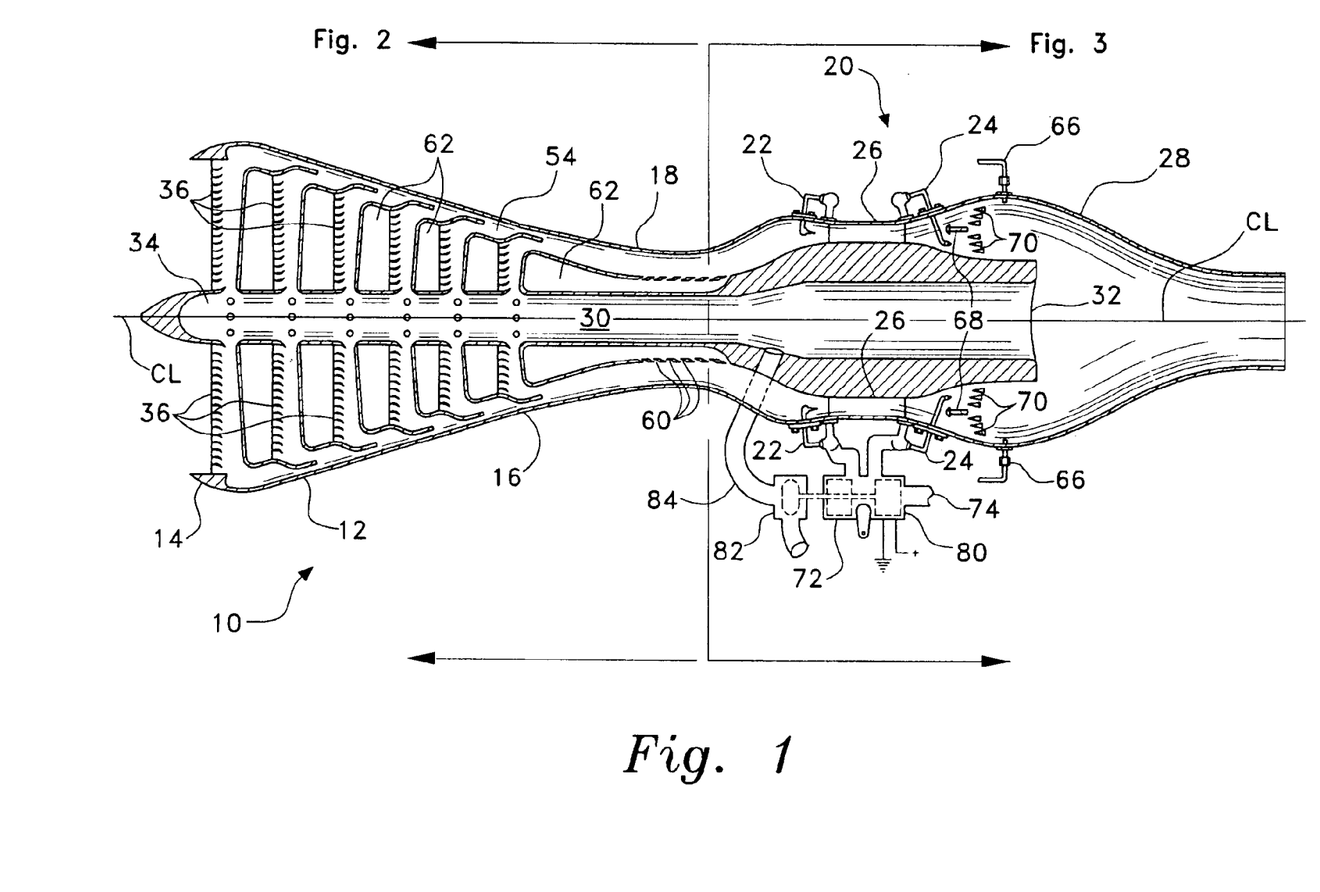
FIG. 1 is a side elevation view in section of a turbineless jet engine according to the present invention, showing its general features.
Figure 2:
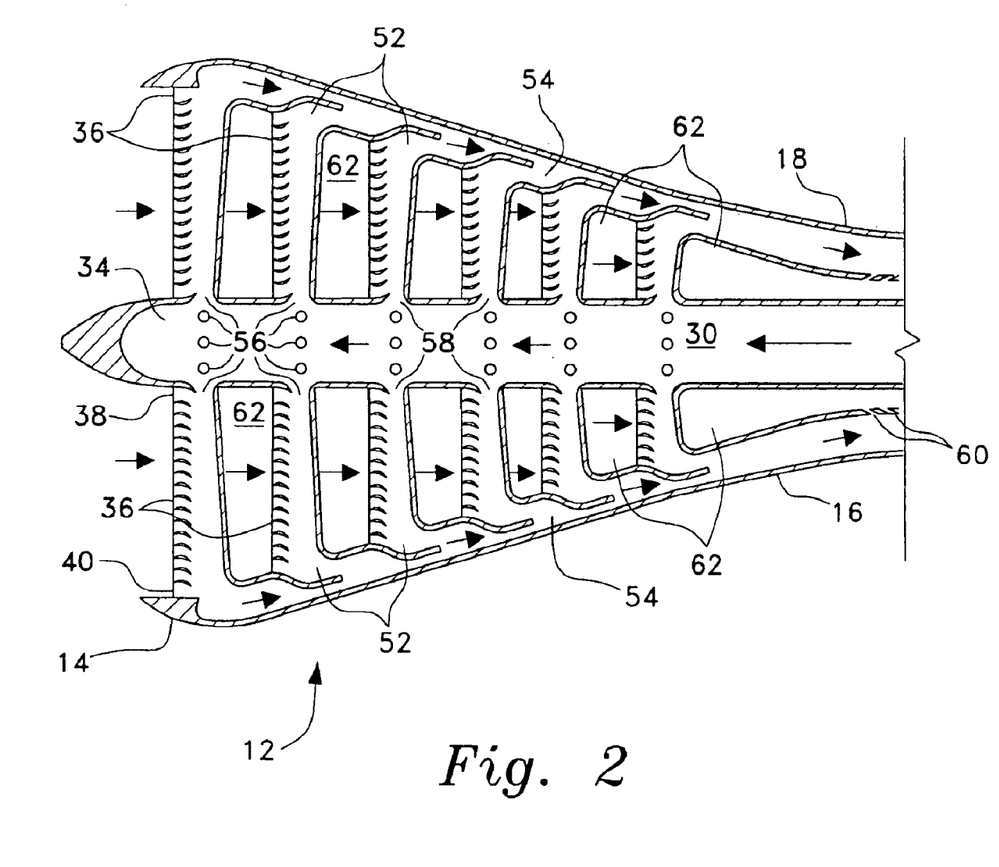
FIG. 2 is a detailed side elevation view in section of the forward, pressure generator section of the turbineless engine of FIG. 1, showing further details thereof.
Figure 3:
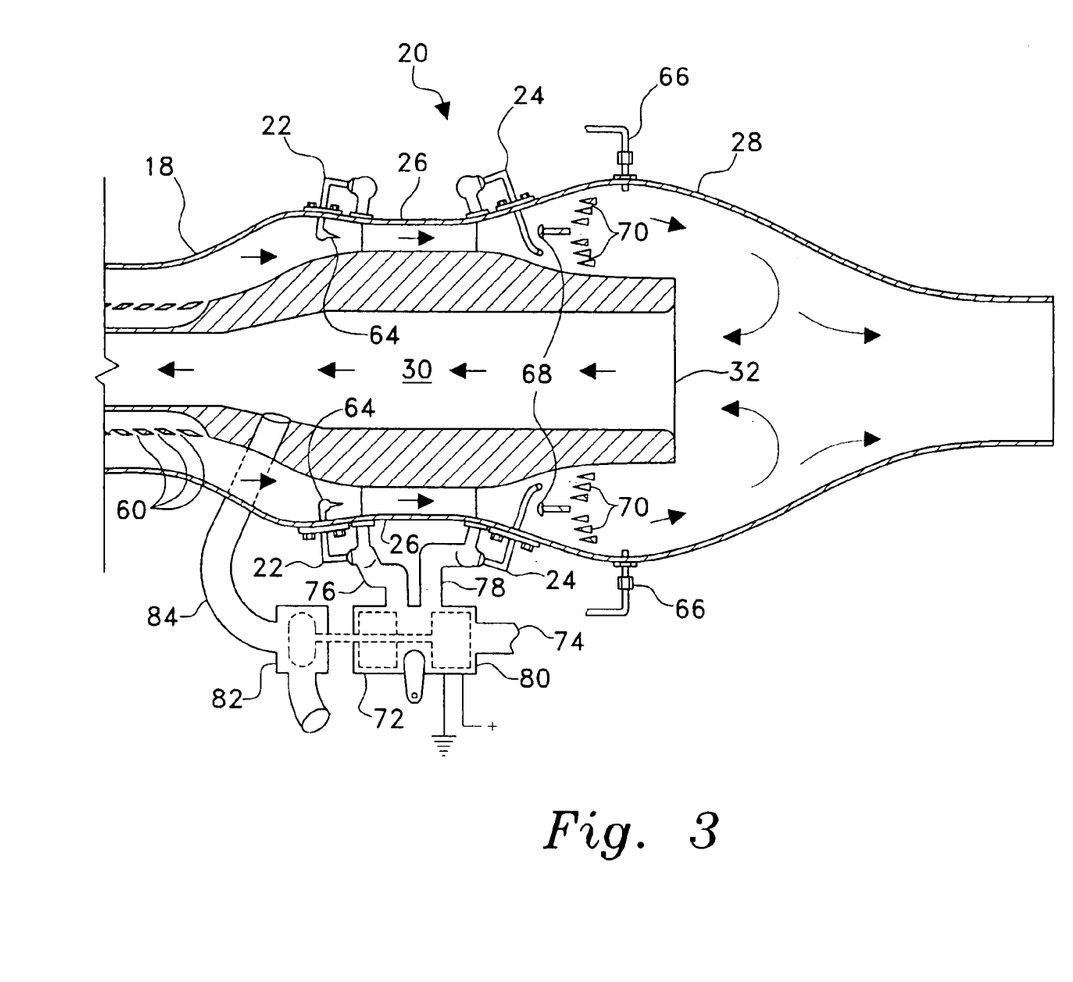
FIG. 3 is a detailed side elevation view in section of the central and rear sections of the turbineless engine of FIG. 1, showing further details thereof.

FIG. 1 of the drawings provides an elevation view in section of the overall engine 10 of the present invention, with FIGS. 2 and 3 providing more detailed sectional elevation views of its forward and rearward portions. The present engine 10 includes a forwardly disposed air inlet section 12, very roughly analogous to the compressor section of a conventional turbojet engine, but having no rotating compressor fans or other moving parts. The air inlet section 12 has a forward or airflow entrance end 14, and an opposite rearward or airflow exit end 16 which communicates with an intermediate airflow passage area 18 between the air inlet section 12 and the generally centrally disposed fuel injector section 20.

The fuel injector section 20 includes a plurality of forwardly disposed starting injectors 22 and a similar plurality of rearwardly disposed run injectors 24, with each set of injectors 22 and 24 disposed in an annular array with a like plurality of air entrainment venturis 26 disposed in an annular array between the start injectors 22 and run injectors 24, forward of the rearward, annularly configured combustion and exhaust section 28.

The present engine 10 also includes a large diameter exhaust gas recirculation duct 30, which extends along the centerline CL or longitudinal axis of the engine 10 from its rearward end 32 in the combustion and exhaust section 28 to its opposite forward end 34 in the forward portion 14 of the air inlet section 12 of the engine 10. Other major components of the present engine 10, i.e., the air inlet section 12, fuel injection section 20, and combustion and exhaust section 28, are also preferably concentrically disposed about the longitudinal axis CL of the engine 10, but it will be seen that as the present engine 10 contains no internal moving parts or components, that the present engine 10 lends itself to other than radially symmetrical configurations, if so desired. The rearward end 32 of the recirculation duct 30 is open to the ambient exhaust pressure and flow developed in the combustion section 28 of the engine 10, with exhaust gases recirculating forwardly through the duct 30 to the forward air inlet portion 12 of the engine 10, for purposes explained further below.

Figure 5:
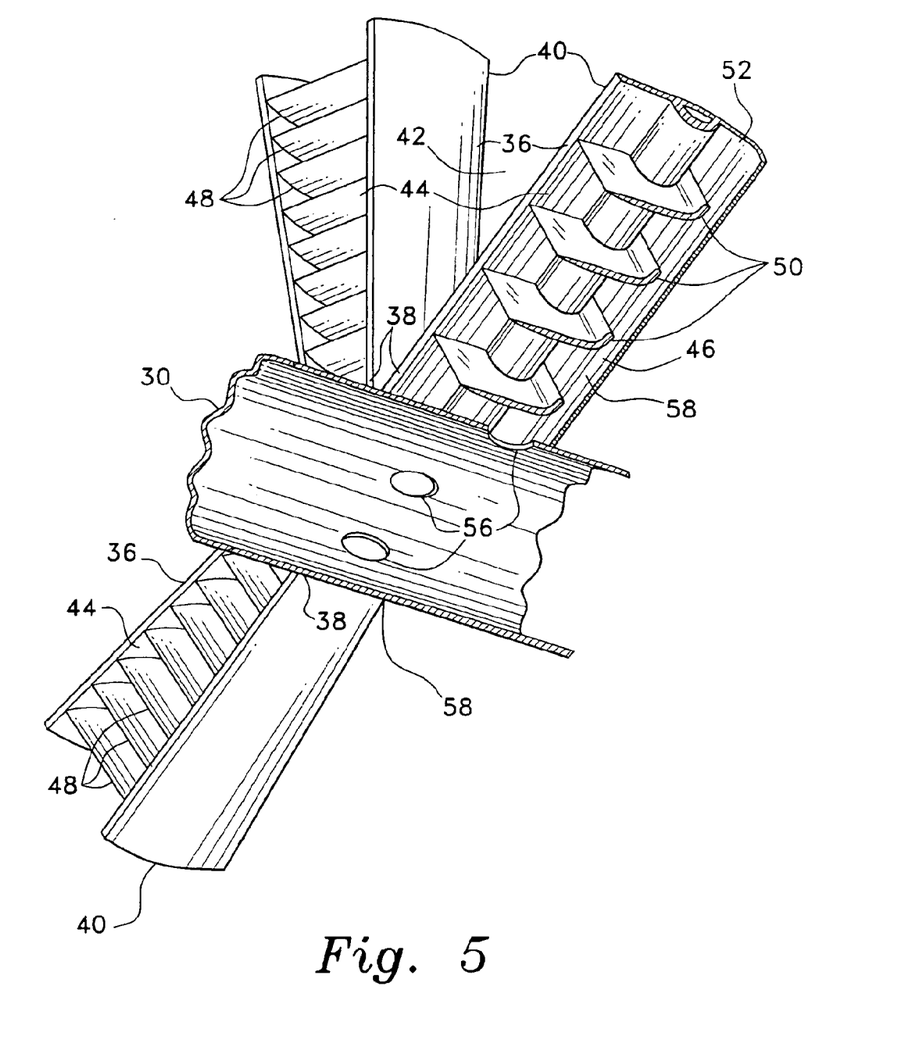
FIG. 5 is a broken away detail perspective view of a portion of one inlet vane row or stage, showing details thereof.

FIG. 2 of the drawings provides a more detailed cross sectional view of the air inlet end 12 of the present turbineless engine 10, with FIG. 5 providing a broken away perspective view of the individual louvered pressure generators 36 of the inlet portion 12 of the engine 10. The inlet portion or end 12 of the engine 10 essentially comprises a number of pressure generators 36, which extend radially from their inner ends 38 along the exhaust gas recirculation duct 30 to their opposite outer ends 40. Preferably, a plurality of rows or stages of such pressure generators 36, e.g., six stages, as illustrated in the example of FIGS. 1 and 2, are provided along the length of the air inlet section 12 in order to process a greater volume of incoming airflow by the pressure generators 36. However, a greater or lesser number of rows or stages of such pressure generators 36 may be provided in any given configuration or embodiment of the present engine, as desired.

The louvered pressure generators 36 are spaced apart radially with each pair of adjacent pressure generators 36 defining an air inlet passage 42 therebetween, as shown clearly in the FIG. 5 perspective view. Each of the pressure generators 36 includes an open front air inlet side 44, which communicates with a rearward, radially disposed airflow passage 46 therein. A series of airflow guide louvers 48 are placed across each of the pressure generators 36, with their outwardly turned trailing edges 50 serving to guide or channel airflow entering the pressure generators 36 radially outwardly along the interior of the airflow passage 46. The outer ends 52 of the airflow passages 46 within the pressure generators 36 are open to an annular airflow passage 54, which extends from the forward portion 14 to the rearward portion 16 of the air inlet section 12 of the engine 10, where it channels the airflow collected from the louvered pressure generators 36 into the annular intermediate airflow passage 18.

The forward portion of the exhaust gas recirculation duct 30 includes a series of radially disposed exhaust gas passages 56 therethrough, with each of these exhaust gas passages 56 being aligned with the inboard end 58 of the airflow passages 46 of one of the louvered pressure generators 36. After the engine 10 has started and is running, a portion of the engine exhaust flows forwardly into the open rearward end 32 of the exhaust recirculation duct 30, continuing through the duct 30 to flow outwardly from the exhaust gas passages 56 in the forward portion of the duct 30. The exhaust gas escaping from the duct 30 then passes through the airflow passages 46 of the pressure generators 36, entraining ambient air into the pressure generators 36 from their open forward inlets 44. The radially outwardly angled trailing edges 50 of the pressure generator louvers 48 assist in guiding the ambient airflow outwardly along the airflow passages 46, where the exhaust and ambient air mix passes into the annular airflow passage 54 surrounding the inlet portion 12 of the engine 10 and continuing to the annular intermediate air passage area 18. Ambient air is also drawn through the air passages 42 between the inlet guides 36, by entrainment of air through the louvers 60 in the intermediate air passage area 18 between the intermediate annular airflow passage 18 and the interior airflow area 62 extending between and around the series of pressure generators 36 in the forward section 12 and continuing to the area between the exhaust recirculation duct 30 and the annular intermediate airflow passage 18.

Figure 4:
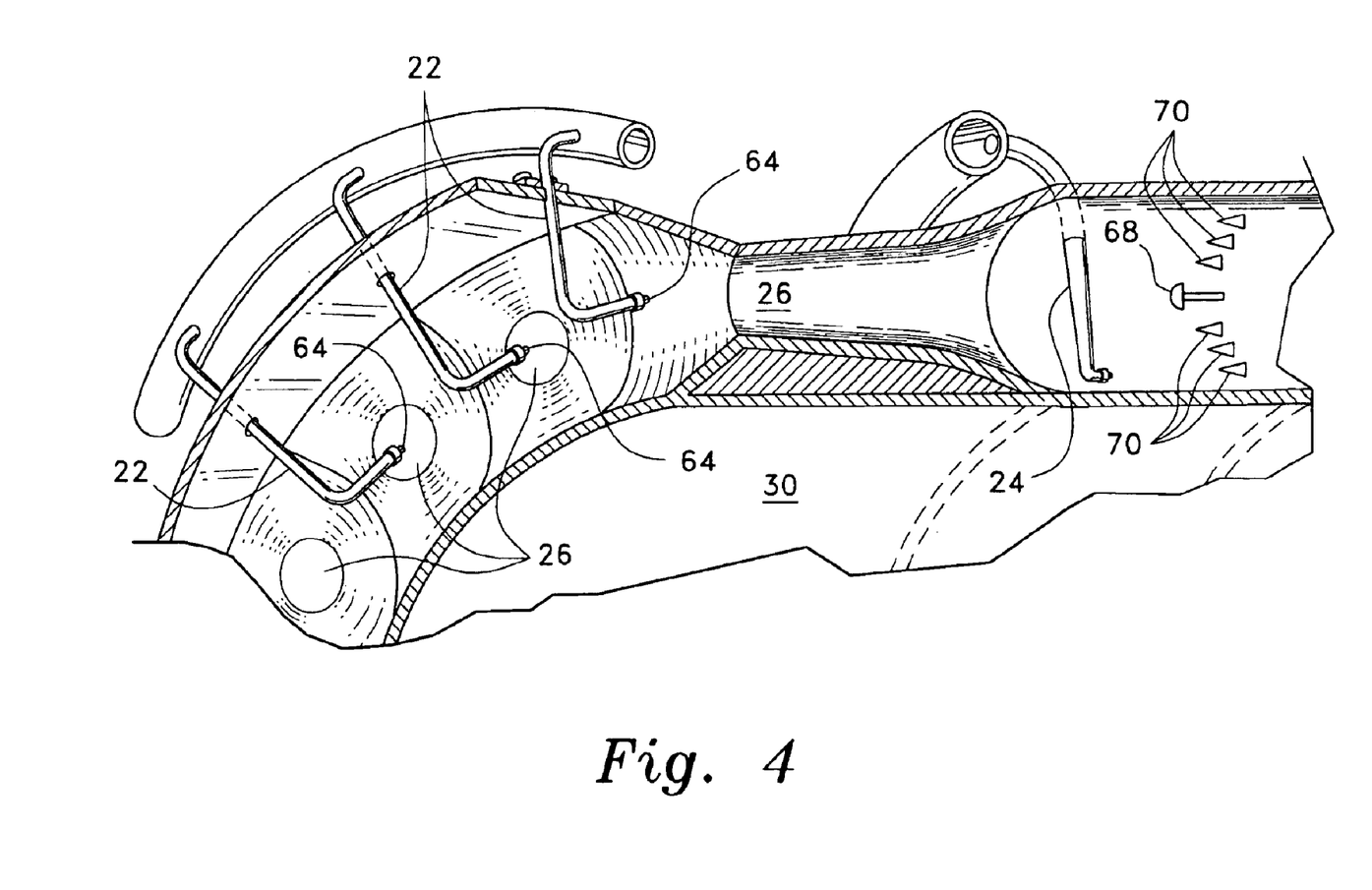
FIG. 4 is a broken away detail perspective view of the combustion area inlets of the present engine, showing details thereof.

Referring to FIGS. 3 and 4, the above described operation is initiated by means of the starting fuel injectors 22, with one such starting injector 22 positioned immediately in front of each of the air entrainment venturis 26, as noted further above. Each of the starting injectors 22 includes an outlet nozzle 64 which is aligned axially with the ambient airflow through its corresponding venturi 26; this is shown most clearly in FIG. 4 of the drawings. Fuel is injected into the passage immediately in front of each venturi 26, thereby entraining airflow into and through the venturi 26. Conventional igniters 66 are positioned rearwardly of the venturis 26 to ignite the air and fuel mixture for starting, and as desired during other conditions of operation (e.g., rain, etc.).

Operation is continued after starting by means of a series of run fuel injectors 24 positioned rearwardly of each of the airflow entrainment venturis 26, as noted further above. Once operation has stabilized after initializing the operation with the starting injectors 22 and producing the exhaust recirculation and air entrainment cycle described further above, the run injectors 24 are operated to supply the required fuel for operation.

It is important that the starting injector nozzles 64 provide a stream of fuel aligned with the airflow through the entrainment venturis 26, in order to entrain airflow through the venturis 26 and thus through the engine 10 for starting and initial operation. However, such a stream of fuel does not burn readily; it is important that the fuel stream be broken up into very small droplets and/or vaporized in the air, before ignition. Accordingly, a fuel deflector 68 is located immediately downstream of each of the starting injector nozzles 64. The nozzles of the run injectors 24 are offset from the fuel deflectors 68, and are configured to produce a fuel mist or spray for more efficient burning, as desired. In addition, a series of flame deflectors 70 is located between each fuel deflector 68 and corresponding igniter 66, serving to preclude advance of the flame front forwardly in the engine 10 during operation.

Fuel for engine operation is provided by one or more fuel pump assemblies 72, with a single such fuel pump 72 being shown in FIGS. 1 and 3. The fuel pump 72 receives fuel from a fuel supply line 74 and distributes the fuel to either the start or run injectors 22 or 24 by corresponding fuel distribution lines 76 and/or 78, as indicated in FIG. 3. Power for the fuel pump 72 is initially provided by a conventional electric motor 80 for starting. However, once the engine 10 has been started and sufficient exhaust pressure and volume is being produced, some of the exhaust may be routed to drive a fuel pump drive turbine 82 via a duct 84 extending from the exhaust gas recirculation duct 30 to the exhaust driven fuel pump drive turbine 82. Once the engine 10 has been started, electrical power to the fuel pump drive motor 80 and igniters 66 may be terminated, with the engine 10 continuing to operate by means of the continuous combustion cycle of operation and the exhaust powered fuel pump drive turbine 82 without need of electrical power.

The present turbineless jet engine 10 contains no internal moving parts or components whatsoever, as explained further above. The only moving parts associated with the present engine 10 in any of its embodiments, are the fuel pump assembly or assemblies 72 described above, and perhaps other conventional accessories such as a generator(s), alternator(s), etc., which may be powered by an exhaust driven turbine, similar to the fuel pump drive turbine 82.

Figure 6:
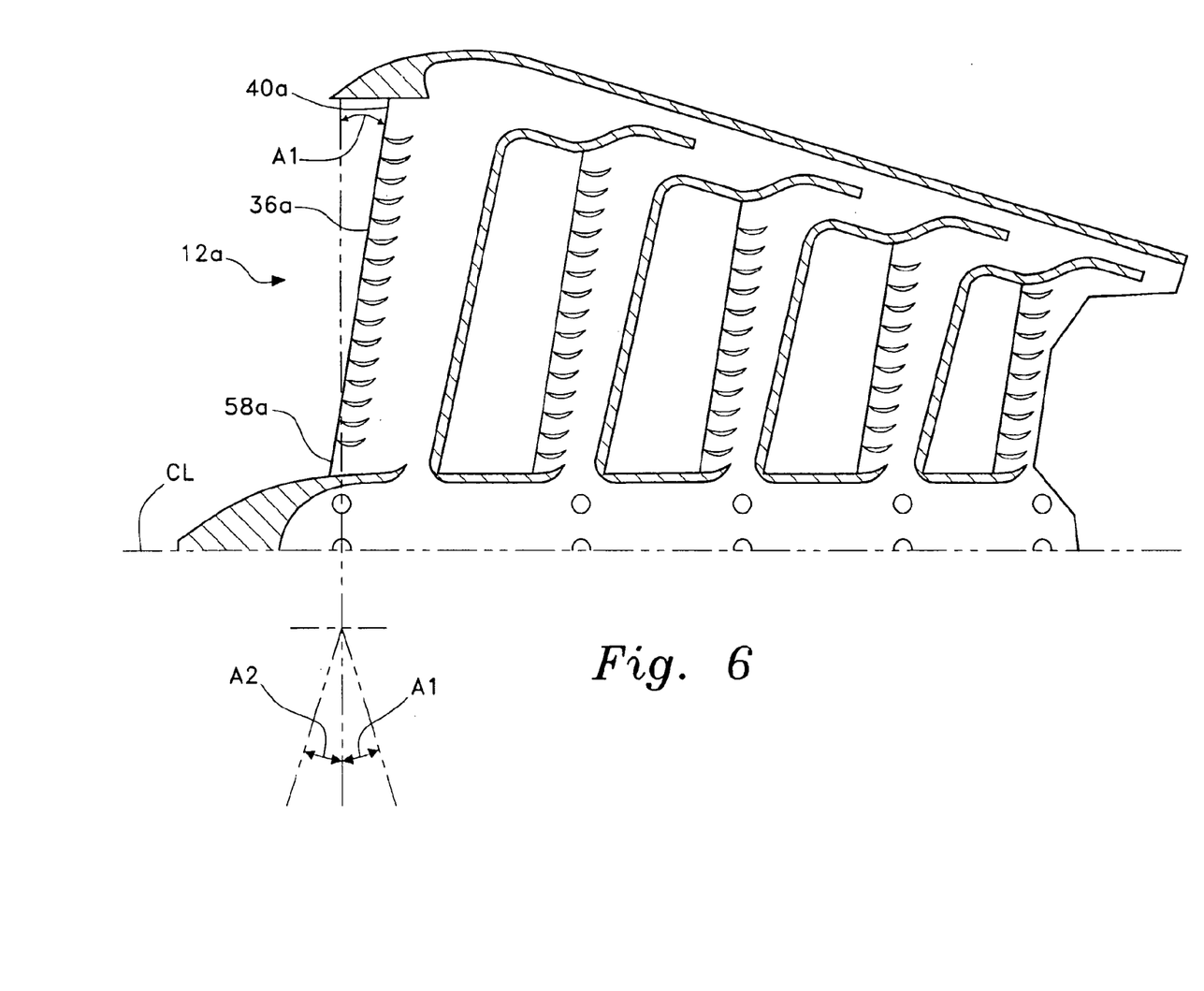
FIG. 6 is a detailed side elevation view in section of an alternate embodiment of the pressure generator section of the present engine, illustrating sweepback of the pressure generators.
Figure 7A:
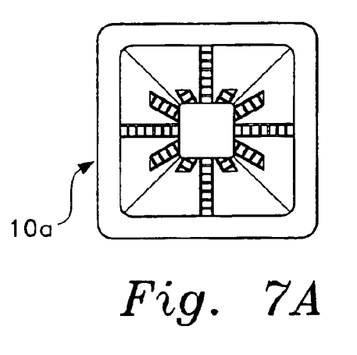
FIG. 7A is a front elevation view of a first alternative embodiment of the present turbineless jet engine invention, illustrating a generally square or rectangular cross-section.
Figure 7B:
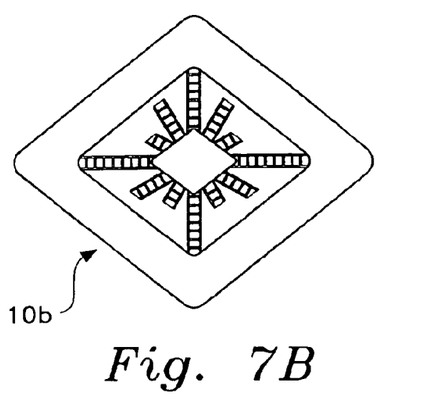
FIG. 7B is a front elevation view of a second alternative embodiment of the present turbineless jet engine invention, illustrating a rhomboid cross section.
Figure 7C:
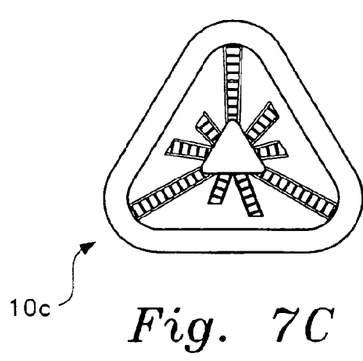
FIG. 7C is a front elevation view of a third alternative embodiment of the present turbineless jet engine invention, illustrating a generally triangular cross section.
Figure 7D:
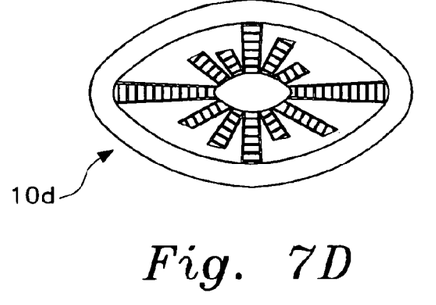
FIG. 7D is a front elevation view of a fourth alternative embodiment of the present turbineless jet engine invention, illustrating a generally elliptical cross section.

As none of the internal components of the present engine 10 rotate or otherwise move during operation, they are not restricted. to any given configuration or plane, as is the case with conventional turbojet engines. FIG. 6 illustrates a broken away elevation view in section of an alternative embodiment of the forward or air inlet section of the engine, designated as air inlet section 12a. This air inlet section 12a embodiment functions similarly to the air inlet section 12 embodiment of FIGS. 1, 2, and 5, but it will be noted that the louvered pressure generators 36a are swept back at an angle A1 from normal to the centerline CL or longitudinal axis of the engine, i.e., the outer ends 40a of the pressure generators 36a are positioned somewhat rearwardly of their opposite inboard ends 58a. It will be seen that this sweepback angle may be adjusted as desired for one or more rows or stages of the pressure generators 36a, or varied between different pressure generators 36a in a given row or stage if so desired. Alternatively, a forward sweep angle A2 may be provided for one or more pressure generators in one or more rows or stages, as desired.

The lack of rotating or moving parts and components within the present engine 10 provides another advantage which is not possible with a conventional turbojet engine. Since there are no rotating components describing a circular path of rotation within the present engine, there is no requirement that the cross-sectional shape of the present engine be circular. FIGS. 7A through 7D illustrate front elevation views of a series of exemplary cross-sectional shapes for the present turbineless engine, with the engine 10a of FIG. 7A having a square or rectangular cross section, the engine 10b of FIG. 7B having a rhomboid cross section, the engine 10c of FIG. 7C having a generally triangular cross section, and the engine 10d of FIG. 7D having an elliptical cross section. While only the relatively larger air inlet section of each engine configuration 10a through 10d is illustrated in FIGS. 7A through 7D, it will be understood that the corresponding shape is applied to all sections of each engine 10a through 10d, i.e., the air inlet section, fuel injection section, combustion section, and exhaust gas recirculation duct.

Such non-circular engine cross sections may not provide the efficiency of an engine having a circular cross section, due to the increase in surface area relative to the internal volume of such non-circular shapes. However, such non-circular shapes may lend themselves to more efficient packaging in various installations, with the corresponding reduction in external surface area ("wetted area") of the aircraft compensating for any losses of efficiency due to the non-circular cross-sectional shapes of the present engine. It will also be seen that such non-circular cross-sectional shapes also lend themselves well to adaptation within aircraft configured to have low radar reflectivity. The various non-circular cross sectional shapes illustrated in FIGS. 7A through 7D are exemplary, and it will be noted that a myriad of different non-circular cross sectional shapes may be achieved in a turbineless engine according to the present invention.

In conclusion, the present turbineless jet engine, in its various embodiments, provides the potential to greatly reduce the manufacturing and operating costs in comparison to conventional turbojet engines. The lack of moving or rotating parts and components in the present turbineless engine serves to greatly reduce the manufacturing costs and labor involved in the highly precise production of compressor and turbine blades which must be carefully balanced and formed of costly materials due to the centrifugal forces applied and the high heat applied to the exhaust turbine blades. The present engine provides a number of additional advantages as well, such as its ability to operate without need for external electrical power once it has been started; the ability of the louvered pressure generators to be positioned at any practicable angle relative to the centerline of the engine, depending upon the anticipated operating parameters; and the wide range of non-circular cross-sectional shapes in which the present engine may be manufactured. The above features of the present turbineless engine will be seen to provide numerous advantages which are not possible to achieve with conventional turbojets or other types of reaction engines.

It is to be understood that the present invention is not limited to the embodiments described above, but encompasses any and all embodiments within the scope of the following claims.

I claim:

1. A continuous combustion reaction engine devoid of internal moving parts, comprising:

a forwardly disposed air inlet section, having a forward end and a rearward end opposite said forward end;

a centrally disposed fuel injection section;

a rearwardly disposed, annular combustion section;

a large diameter, concentrically disposed exhaust gas recirculation duct, extending forwardly from said combustion section through said fuel injection section to said air inlet section;

said exhaust gas recirculation duct having an open rearward end communicating with said combustion section, and a forward end opposite said rearward end;

a plurality of radially disposed pressure generators within said air inlet section, defining a corresponding plurality of air inlet passages therebetween;

each of said pressure generators having an inner end, an outer end opposite said inner end, a forwardly disposed, open air inlet side, a rearwardly disposed airflow passage therethrough communicating with said air inlet side, and a plurality of airflow guide louvers disposed within said air inlet side;

said exhaust gas recirculation duct further having a plurality of radially disposed exhaust gas passages adjacent said forward end thereof, each communicating with a corresponding said airflow passage of one of said pressure generators;

an annular airflow passage surrounding said air inlet section and extending rearwardly to said fuel injection section;

each said airflow passage of said pressure generators further having an outer end communicating with said annular airflow passage; and a plurality of air entrainment venturis disposed in an annular array about and forwardly adjacent said rearward end of said exhaust gas recirculation duct.

2. The engine according to claim 1, further including:

at least one fuel pump;

an electrically powered fuel pump drive motor, operating said at least one fuel pump during starting operations;

an engine exhaust powered fuel pump drive turbine, operating said at least one fuel pump during operation after starting; and an exhaust duct extending from said exhaust gas recirculation duct to said engine exhaust powered fuel pump drive turbine.

3. The engine according to claim 1, further including:

a starting fuel injector disposed forwardly of each of said air entrainment venturis;

an outlet nozzle extending from each said injector, and aligned axially with airflow through the corresponding one of said air entrainment venturis;

a run fuel injector disposed generally rearwardly of each of said air entrainment venturis; and a fuel deflector disposed rearwardly of and aligned with at least said outlet nozzle of each said starting fuel injector.

4. The engine according to claim 1, wherein said pressure generators are disposed in a plurality of stages extending from the forward end to the rearward end of said inlet section.

5. The engine according to claim 1, wherein:

said air inlet section, said fuel injection section, said combustion section, and said exhaust gas recirculation duct are concentrically disposed about a longitudinal axis; and said pressure generators are swept at an angle other than normal to said longitudinal axis.

6. The engine according to claim 1, wherein said air inlet section, said fuel injection section, said combustion section, and said exhaust gas recirculation duct have other than a circular cross-sectional shape.

7. A continuous combustion reaction engine devoid of internal moving parts, comprising:

a forwardly disposed air inlet section, having a forward end and a rearward end opposite said forward end;

a centrally disposed fuel injection section;

a rearwardly disposed, annular combustion section;

a large diameter, concentrically disposed exhaust gas recirculation duct, extending forwardly from said combustion section through said fuel injection section to said air inlet section;

said exhaust gas recirculation duct having an open rearward end communicating with said combustion section, and a forward end opposite said rearward end;

a plurality of radially disposed pressure generators within said air inlet section, defining a corresponding plurality of air inlet passages therebetween;

each of said pressure generators having an inner end, an outer end opposite said inner end, a forwardly disposed, open air inlet side, a rearwardly disposed airflow passage therethrough communicating with said air inlet side, and a plurality of airflow guide louvers disposed within said air inlet side;

said exhaust gas recirculation duct further having a plurality of radially disposed exhaust gas passages adjacent said forward end thereof, each communicating with a corresponding said airflow passage of one of said pressure generators;

an annular airflow passage surrounding said air inlet section and extending rearwardly to said fuel injection section;

each said airflow passage of said pressure generators further having an outer end communicating with said annular airflow passage;

at least one fuel pump;

an electrically powered fuel pump drive motor, operating said at least one fuel pump during starting operations;

an engine exhaust powered fuel pump drive turbine, operating said at least one fuel pump during operation after starting; and an exhaust duct extending from said exhaust gas recirculation duct to said engine exhaust powered fuel pump drive turbine.

8. The engine according to claim 7, further including a plurality of air entrainment venturis disposed in an annular array about and forwardly adjacent said rearward end of said exhaust gas recirculation duct.

9. The engine according to claim 7, further including:

a starting fuel injector disposed forwardly of each of said air entrainment venturis;

an outlet nozzle extending from each said injector, and aligned axially with airflow through the corresponding one of said air entrainment venturis;

a run fuel injector disposed generally rearwardly of each of said air entrainment venturis; and a fuel deflector disposed rearwardly of and aligned with at least said outlet nozzle of each said starting fuel injector.

10. The engine according to claim 7, wherein said pressure generators are disposed in a plurality of stages extending from the forward end to the rearward end of said inlet section.

11. The engine according to claim 7, wherein:

said air inlet section, said fuel injection section, said combustion section, and said exhaust gas recirculation duct are concentrically disposed about a longitudinal axis; and said pressure generators are swept at an angle other than normal to said longitudinal axis.

12. The engine according to claim 7, wherein said air inlet section, said fuel injection section, said combustion section, and said exhaust gas recirculation duct have other than a circular cross-sectional shape.

13. A continuous combustion reaction engine devoid of internal moving parts, comprising:

a forwardly disposed air inlet section, having a forward end and a rearward end opposite said forward end;

a centrally disposed fuel injection section;

a rearwardly disposed, annular combustion section;

a large diameter, concentrically disposed exhaust gas recirculation duct, extending forwardly from said combustion section through said fuel injection section to said air inlet section;

said exhaust gas recirculation duct having an open rearward end communicating with said combustion section, and a forward end opposite said rearward end;

a plurality of radially disposed pressure generators within said air inlet section, defining a corresponding plurality of air inlet passages therebetween;

each of said pressure generators having an inner end, an outer end opposite said inner end, a forwardly disposed, open air inlet side, a rearwardly disposed airflow passage therethrough communicating with said air inlet side, and a plurality of airflow guide louvers disposed within said air inlet side;

said exhaust gas recirculation duct further having a plurality of radially disposed exhaust gas passages adjacent said forward end thereof, each communicating with a corresponding said airflow passage of one of said pressure generators;

an annular airflow passage surrounding said air inlet section and extending rearwardly to said fuel injection section;

each said airflow passage of said pressure generators further having an outer end communicating with said annular airflow passage;

a plurality of starting fuel injectors, each disposed forwardly of said combustion section;

an outlet nozzle extending from each of said injectors, and aligned axially with airflow;

a plurality of run fuel injectors, each disposed generally rearwardly of a corresponding one of said starting fuel injectors and forwardly of said combustion section; and a fuel deflector disposed rearwardly of and aligned with at least each of said outlet nozzles of said starting fuel injectors.

14. The engine according to claim 13, further including:

at least one fuel pump;

an electrically powered fuel pump drive motor, operating said at least one fuel pump during starting operations;

an engine exhaust powered fuel pump drive turbine, operating said at least one fuel pump during operation after starting; and an exhaust duct extending from said exhaust gas recirculation duct to said engine exhaust powered fuel pump drive turbine.

15. The engine according to claim 13, further including:

a plurality of air entrainment venturis disposed in an annular array about and forwardly adjacent said rearward end of said exhaust gas recirculation duct, between said starting fuel injectors and said run fuel injectors.

16. The engine according to claim 13, wherein said pressure generators are disposed in a plurality of stages extending from the forward end to the rearward end of said inlet section.

17. The engine according to claim 13, wherein:

said air inlet section, said fuel injection section, said combustion section, and said exhaust gas recirculation duct are concentrically disposed about a longitudinal axis; and said pressure generators are swept at an angle other than normal to said longitudinal axis.

18. The engine according to claim 13, wherein said air inlet section, said fuel injection section, said combustion section, and said exhaust gas recirculation duct have other than a circular cross sectional shape.

* * * * *